(12) United States Patent
Caldwell (10) Patent No.: US 8,366,124 B1
(45) Date of Patent: Feb. 5, 2013

(54) CONVERTIBLE BEACH CART (76) Inventor: Richard Caldwell, Christiansburg, VA (US)

( * ) Notice: Subject to any disclaimer, the term of this patent is extended or adjusted under 35 U.S.C. 154(b) by 0 days.

(21) Appl. No.: 13/213,958

(22) Filed: Aug. 19, 2011

(51) Int. Cl.
B62B 1/04 (2006.01)
(52) U.S. Cl. .................................. 280/30; 280/47.18
(58) Field of Classification Search ............... 280/43.1, 280/43.11, 651, 652, 653, 655, 655.1, 654, 280/47.131, 47.17, 47.18, 47.19, 47.2, 47.24, 280/47.26, 47.27, 47.34, 47.35
See application file for complete search history.

(56) References Cited

U.S. PATENT DOCUMENTS

| | | | | |
|---|---|---|---|---|
| 2,065,233 A | * | 12/1936 | Mallett | 297/2 |
| 2,519,113 A | * | 8/1950 | Cohn | 280/659 |
| 3,350,797 A | | 11/1967 | Dassinger et al. | |
| 3,677,571 A | * | 7/1972 | Maturo et al. | 280/654 |
| 3,693,993 A | | 9/1972 | Mazzarelli et al. | |
| 3,804,432 A | * | 4/1974 | Lehrman | 280/654 |
| 4,561,674 A | | 12/1985 | Alessio | |
| 4,588,197 A | | 5/1986 | Benedetto, Jr. | |
| 4,703,944 A | | 11/1987 | Higson | |
| 4,865,346 A | * | 9/1989 | Carlile | 280/654 |
| 4,887,837 A | * | 12/1989 | Bonewicz et al. | 280/654 |
| 5,356,197 A | * | 10/1994 | Simic | 297/129 |
| 5,660,403 A | | 8/1997 | O'Neill et al. | |
| 5,944,333 A | * | 8/1999 | Kent | 280/204 |
| 6,079,777 A | * | 6/2000 | Simmons et al. | 297/217.1 |
| 6,113,129 A | | 9/2000 | Marques et al. | |
| 6,942,228 B2 | * | 9/2005 | Bunce et al. | 280/30 |
| 7,494,149 B2 | | 2/2009 | Liu et al. | |
| 7,588,255 B2 | | 9/2009 | Katz | |
| 7,762,363 B1 | | 7/2010 | Hirschfeld | |
| 7,819,407 B1 | | 10/2010 | Charitun | |
| 2001/0007387 A1 | * | 7/2001 | Gomez | 280/47.17 |
| 2004/0032101 A1 | * | 2/2004 | Oliver | 280/47.24 |
| 2005/0104308 A1 | * | 5/2005 | Barnes | 280/47.24 |
| 2005/0161916 A1 | * | 7/2005 | Taylor | 280/655.1 |
| 2006/0157944 A1 | | 7/2006 | Alexander | |
| 2009/0051133 A1 | | 2/2009 | Oshiro | |

* cited by examiner

Primary Examiner — J. Allen Shriver, II
Assistant Examiner — Bridget Avery
(74) Attorney, Agent, or Firm — New River Valley IP Law; Michele L. Mayberry (57) ABSTRACT Utility carts and hand trucks which are easily assembled, low cost, and usable as durable convertible beach carts adaptable for a wide variety of uses including as beach furniture. A preferred embodiment includes a convertible hand truck with three main components: a hand truck body with dual use as a table, a load platform with dual use as an extended surface of the table, and a rack with dual use as support legs for the table.

16 Claims, 7 Drawing Sheets

CONVERTIBLE BEACH CART

BACKGROUND OF THE INVENTION

1. Field of the Invention

The present invention relates to utility carts and hand trucks. More particularly, the present invention relates to easily assembled and low cost convertible beach carts adaptable for a wide variety of uses including as beach furniture. Preferred embodiments include a hand truck comprising (i) a body having secondary use as a table, (ii) a load platform having secondary use as an extended surface of the table, and (iii) a rack having secondary use as support legs for the table.

2. Description of Related Art

Many people enjoy recreational activities. However, many of these recreational activities require that various accessories be brought along so that one can further enhance that particular recreational activity. One common experience shared by nearly everyone is the recreational activity of spending a day at the beach. Many that do enjoy a day at the beach seem to bring with them all sorts of accessory items. Some of these beach accessories usually include beach bags, towels and blankets, chairs, tables, beach toys, sports equipment, paperback books, extra clothing, umbrellas, coolers filled with food and drinks, etc. The burden of transporting all of these accessories to the beach can quickly become an overwhelming task when more than one trip is required. Conventional prior art solutions used to accomplish this task of transporting these types of accessories are the use of bags, backpacks and even utility carts. One common disadvantage shared with nearly all of the conventional wheeled prior art solutions is that in order to carry large objects like beach furniture, these solutions tend to be rather large and difficult to maneuver or carry on uneven surfaces such as sandy beaches.

Most conventional carts used to date have rectangular bodies with four walls configured to carry items and materials therein. Four wheels usually support the conventional cart. A handle is typically provided so that the cart can be rolled manually by pulling on the handle. It is also commonly known to rotatably mount the front wheels on an axle that is rotatably mounted to the bottom of the cart body. The handle is then mounted to the axle and the cart can be steered by pulling the handle in any desired steering direction, thereby rotating the front axle and aligning the front wheels in that direction. The conventional cart, however, presents a number of problems and shortcomings. Conventional carts fail to provide a means for organizing the various accessories transported by these carts so that the user may conveniently and safely gain access to each accessory. Conventional carts also often have little more than one open chamber where all of the items to be transported are placed, and it is difficult to place large objects in such a compartment unless the cart is very large itself and without damaging other items. If the carts are not large, then they fail to provide an adequate surface on which a user can arrange and manipulate certain items and materials. Conventional carts also fail to provide a convenient means for decontaminating or cleaning the cart other than the means of flooding the storage chamber with soap and water and turning the cart upside down so that the dirt or sand may drain. Often they are made of materials that deteriorate in challenging weather conditions such as exposure to salt water and extreme heat commonly found at the beach. Therefore, the prior art carts all have significant limitations, as discussed above.

Other means for transporting items to the beach include hand trucks. Such hand trucks usually comprise an upright body similar to that of a utility dolly with two wheels at the base and a handle bar. Objects are hung on the hand truck on racks or placed on the load platform near the wheels and pushed or pulled through the sand using the wheels. Some of the prior art hand trucks have load bearing platforms that collapse against the direction of the load it is designed to carry in order to fold up against the body of the hand truck for convenient storage. Such hand trucks are usually configured for resisting or preventing folding of the load platform away from the hand truck body past 90 degrees, as such a configuration would typically lead to failure of the platform under the load. Other such hand trucks are not balanced properly to resist tip over when standing upright with a load. Some hand trucks have too narrow a base (are more than two times taller than the base is wide), which may lead to the hand truck tipping over, especially when carrying a top heavy load. Although it would be preferred to have a wider base, such configurations are often not used because it adds to the bulky nature of the cart, which reduces its appeal and applicability in certain situations requiring a narrow profile. Furthermore, wheels are usually disposed on the hand truck body or only slightly away from the body so that heavy loads are easier to maneuver. For example, with the wheels near the axis of rotation of the hand truck body less effort is required to tip the hand truck back toward the user and into a position for transporting the load. This configuration, however, further increases the risk of tip over especially with top heavy loads.

There exist some hand trucks with multiple uses, however, there is no hand truck that is configured for transporting a load in an upright or semi-reclined position and then which is configured for use as a table in a completely reclined position. For example, known multi-use hand trucks include those which provide for transportation of a load in a semi-reclined position and for seating in a fully upright position. Other multi-use hand trucks include those with a load platform which doubles as a work surface, but the size of the work surface is limited by the size of the load platform, which is usually small to keep the overall profile of the hand truck streamlined. The inventor has found a way to keep the overall profile of the hand truck at a minimum but which maximizes the amount of available table space.

From the above discussion it is apparent that what is desired is a beach cart for transporting beach paraphernalia that also functions as a sturdy table to minimize the amount of supplies needing transport for an enjoyable day at the beach. None of the prior art carts or hand trucks address the plurality of needs that might be encountered when using a beach cart, such as the various needs associated with space, durability, reliability, multi-functionality, and ease of movement on the beach. Therefore, it can be appreciated that there exists a continuing need for new and improved beach cart that is capable of meeting these needs.

SUMMARY OF THE INVENTION

The numerous limitations inherent in the conventional beach carts described above provide great incentive for a new, better beach carts and methods of use capable of accounting for one or more of these issues. The present invention relates to hand trucks. More particularly, the present invention relates to easily assembled, low cost, durable convertible beach carts adaptable for a wide variety of uses including as beach furniture.

A preferred embodiment of the invention includes a convertible hand truck with three main components: a hand truck body with dual use as a table, a load platform with dual use as an extended surface of the table, and a rack with dual use as support legs for the table.

Specifically, a convertible hand truck is provided which comprises: (i) a dual-use hand truck body with a first planar member that provides support for items on the hand truck when upright and that provides a table top when reclined 90 degrees; (ii) a dual-use load platform with a second planar member that provides a load bearing surface for loads on the hand truck when upright and that provides an extension of the table top when the hand truck is reclined 90 degrees; and (iii) a dual-use rack that provides support for items on the hand truck when upright and that provides support legs for the table top when reclined 90 degrees.

Such hand trucks can comprise a first set of support legs disposed at a right angle relative to the first planar member and fixed at a first end of the table top and wherein the dual-use rack is disposed at an opposing second end of the table top and comprises a second set of support legs. Further, the hand trucks can comprise wheels in operable communication with the first set of support legs for transporting the hand truck with ease. Ideally, the hand trucks are configured such that the first set of support legs and wheels together provide a height to the first end of the table top that equals a height of the opposing second end of the table top provided by the second set of support legs.

The term "equal" in the context of this invention can include scientific exactness, however, a range of values for the heights are also intended to be included. For example, the allowed range of heights for the first set of support legs and wheels and the second set of support legs can be any height that allows for the table top to function as a work surface. In particular, if the first end of the table top is 1.5 feet from the ground and the second end of the table top is 1 foot from the ground, the table can still be used as a work surface even though the height of each end is not exactly equal. Thus, any difference in height is allowable and specifically a 0%, 25%, 30%, 50%, or 75% difference in the height of each end of the table would still be acceptable. In some cases, a severe incline in the resulting table top may also be tolerable for certain circumstances when there is no height to one end of the table.

Embodiments of the invention can include utility cart structures comprising: a rectangular base or load platform; a rectangular back panel or hand truck body; a top grip (e.g., handle bar) attached to the top of the rectangular back panel and having a rack for hanging items that rotates relative to the back panel for dual use as support legs for a table when the hand truck is fully reclined; and a pair of wheels attached to the hand truck body. In embodiments, the rack or hanging bars can be connected by a cross bar and can each have a corresponding structure providing a hook on the respective outer edges of the hanging bars for hanging items on the hand truck and preventing the items from slipping off of the bars. The hooks (also referred to as feet once in the table position) also provide support for the legs of the table in sand or other soft surface when the hand truck is fully reclined toward the ground. In embodiments, the wheels can be attached by a plurality of crossbars to one another and to the rectangular base panel.

In embodiments, the load platform and rack are in operable communication with the hand truck body in a manner to allow dual use of the load platform as an extension of the table surface and dual use of the rack as support legs. The hand truck body can comprise a first planar member that functions as a back panel when the hand truck is in an upright position and functions as a table when the hand truck is fully reclined. Also included is a first set of support legs fixed at a first end of the truck body. Wheels are further included and are in operable communication with the first set of support legs. The hand truck comprises a load platform with a second planar member that functions as a platform for carrying a load when the hand truck is in an upright or slightly reclined position and functions as an extension of the table surface formed by the back panel of the hand truck when the hand truck is fully reclined. The load platform is disposed at the first end of the truck body opposite the wheels. Means for connecting the load platform to the truck body to provide rotational movement of the load platform relative to the truck body is also included.

Another multi-use component is included which functions in a first position as a rack for hanging items and as a handle bar for pushing the hand truck, and in a second position as support legs for the table and a stop bar for preventing rotation of the support legs beyond a desirable range. This multi-use component is disposed at an opposing second end of the truck body away from the load platform and wheels. Means for connecting the rack to the truck body to provide rotational movement of the rack relative to the truck body is also a feature of embodiments of the invention.

A preferred embodiment includes a convertible hand truck comprising: (i) a truck body with a first planar member and a first set of support legs disposed at a right angle relative to the first planar member and fixed at a first end of the truck body; (ii) wheels in operable communication with the first set of support legs; (iii) a load platform with a second planar member, which load platform is disposed at the first end of the truck body; (iv) means for connecting the load platform to the truck body to provide rotational movement of the load platform between 90-180 degrees away from the first planar member and to lock the load platform at 180 degrees relative to the first planar member; (v) a rack disposed at an opposing second end of the truck body, which rack comprises a second set of support legs and a handle bar; and (vi) means for connecting the rack to the truck body to provide rotational movement of the rack along 180 degrees and to lock the rack at right angles relative to the planar member.

Hand trucks according to embodiments of the invention can further comprise a hole for inserting the pole of an umbrella, for example, a hole in the first planar member.

The load platform of embodiments can comprise feet for resting the load when the hand truck is in an upright position. The second set of support legs can comprise feet as well. The feet of the support legs and the load platform can be operably configured for supporting the table on sand in a manner to provide the first and second planar members parallel to the sand. Preferred feet are about 2 inches wide.

Preferably the hand truck is configured to resist tip over. Specific embodiments include a hand truck that is less than twice as tall as it is wide. When referring to width in this context, the base of the hand truck is the focus. More particularly, one width could be the perpendicular distance from the outermost edge of the load platform to the wheel axle. Another width could be a perpendicular measure from the outermost edge of the load platform to the outermost edge of the wheels.

The features of novelty and various other advantages that characterize the invention are pointed out with particularity in the claims forming a part hereof. However, for a better understanding of the invention, its advantages, and the objects obtained by its use, reference should be made to the drawings that form a further part hereof, and to the accompanying descriptive matter, in that there is illustrated and described a preferred embodiment of the invention. The features and advantages of the present invention will be apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

DETAILED DESCRIPTION OF PREFERRED EMBODIMENTS

The present invention relates to hand trucks, which can be used for transporting needed items to a location, such as the beach. More particularly, the present invention relates to easily assembled, low cost, durable convertible beach carts adaptable for a wide variety of uses including as beach furniture.

One of the objects of the present invention is to provide a convertible beach cart that is easily assembled, low cost, and comprises multiple functionalities with few parts. Embodiments of beach carts according to the invention comprise a plurality of components adaptable for a wide variety of uses including as beach furniture.

With reference to the drawings, preferred embodiments of the invention include a convertible hand truck with three main components: a hand truck body with dual use as a table, a load platform with dual use as an extended surface of the table, and a rack with dual use as support legs for the table. Such hand trucks by providing only three main components are easy to assemble and have fewer parts to minimize the risk of failure, while providing multiple functions (cart and furniture) to reduce the amount of items needed for an expedition.

Of particular interest and as shown in the figures, a convertible hand truck is provided which comprises: (i) a hand truck body, having secondary use as a table, with a first planar member that provides support for items on the hand truck when upright and that provides a table top when reclined about 90 degrees; (ii) a dual-use load platform with a second planar member that provides a load bearing surface for loads on the hand truck when upright and that provides an extension of the table top when the hand truck is reclined 90 degrees; and (iii) a dual-use rack that provides support for items on the hand truck when upright and that provides support legs for the table top when reclined 90 degrees.

Figure 1:
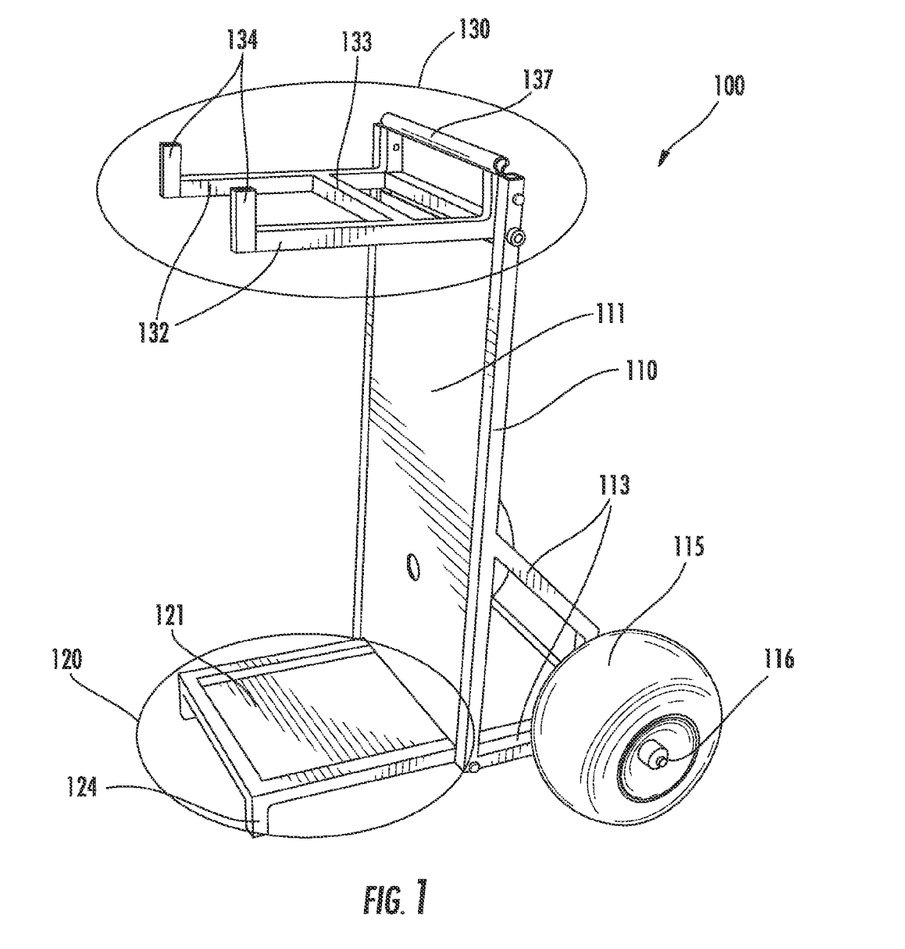
FIG. 1 is a representative diagram of an embodiment of the convertible beach cart of the present invention shown in an upright, ready to transport position.

FIG. 1 is a representative diagram of an embodiment of the convertible beach cart of the present invention shown in an upright, ready to transport position. As shown in FIG. 1, embodiments of the present invention generally comprise a convertible beach cart 100 comprising: a hand truck body 110 with a back panel 111; a load platform 120 with a base panel 121; a rotatable rack 130 with a top grip 137, hanging bars 132, optional cross bar 133, and hooks or feet 134. The inventive carts can also be equipped with wheels 115 (e.g., attached to the hand truck body 110 by a plurality of support bars 113 and an axle 116).

In certain embodiments, and as shown in FIG. 1, the hand truck body 110 can comprise a metal frame. The metal frame provides support for and is attached to the back panel 111 by any means, including soldering, screws, or a tongue and groove attachment, or any combination thereof. Preferably, the hand truck body 110 and back panel 111 are substantially rectangular (i.e., the width of each is less than the length) and provide substantially flat, solid support/work surface. In some embodiments of the present invention, the convertible beach cart is made of metal and is weather-proof. Extruded aluminum is preferred but any metal can be used. An advantage of metal as contrasted with plastic beach carts, is that the weight of the beach cart will resist being blown away from the beach during strong wind conditions. Aluminum is also preferred for its resistance to wet conditions in that it will not deteriorate due or rust. Steel, cast iron, or stainless steel can also be used. Plastic or wood is also an option. The material for the hand truck body and convertible components can be metal coated with plastic as well or a composite material, such as a combination of plastic and wood or wood coated with plastic, paint, or other protective covering.

The height of the hand truck according to embodiments of the invention is any comfortable height for a user to grip the handle bar 137 for pushing the cart, e.g., chest height. Typically, hand trucks having a height ranging from about 3-5 feet will suit most applications. Height of the hand truck can be a measurement of the length of the frame of the hand truck when in an upright position, or can be the total height from the ground including any additional height provided by the wheels. The hand truck can also be equipped with an adjustable handle bar to raise or lower the hand grips to a desired height more customized for each individual user. For example, the handle bar 137 can be connected to the hand truck body 110 by means that provides for slideable engagement of the handle bar 137 with respect to the hand truck body 110. In specific embodiments, the frame of the hand truck body 110 can comprise metal tubing with a square or circular cross section and a specific inner and outer diameter, while the handle bar 137 can be attached to correspondingly shaped and sized metal tubing to allow engagement between the hand truck frame and the handle bar at the outer surface of one and the inner surface of the other. Holes and one or more locking pins can be included so that the handle bar can be raised to several of incremental heights, then locked temporarily in position.

The base of the hand truck comprises wheels 115 and load platform 120. At rest in an upright position (as shown), the only parts of the hand truck that contact the ground are the feet 124 of load platform 120 and wheels 115. The width of this base can be a measurement from an outermost surface of the load platform 120 to the point where the wheels 115 contact the ground, such as a point in line with the wheel axle 116. A wide base, i.e., the width is more than half the height of the hand truck, renders the hand truck almost impossible to tip over. A base with a more narrow width may also be acceptable in certain situations, however, as the width decreases, the risk of tip over increases, especially with top heavy loads in the cart. The load platform 120 of the convertible beach cart can be connected to the hand truck body 110 and the load panel 121 and back panel 111 fold away from one another to a substantially horizontal position to form a table. In such embodiments, the rectangular load platform 120 and load panel 121 may be disposed at a right angle from the hand truck body 110 and back panel 111 and be capable of extending away from the back panel up to 180 degrees from back panel 111. In preferred embodiments, the load platform 120 and the back panel 111 do not fold toward one another for storage.

Figure 2:
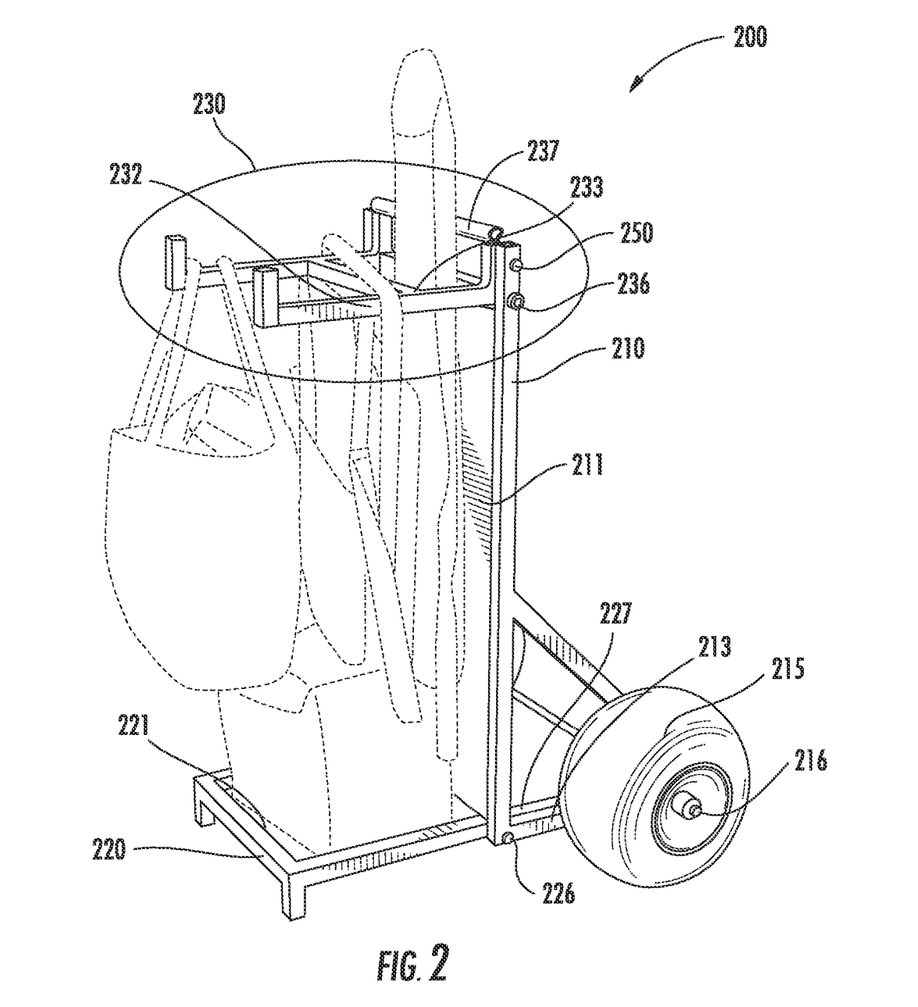
FIG. 2 is a representative diagram of the hand truck shown in FIG. 1, which is in an upright position and loaded with materials to be transported to the beach.

FIG. 2 is a representative diagram of the hand truck shown in FIG. 1, which is in an upright position and loaded with materials to be transported to the beach. As shown in FIG. 2, the convertible hand truck 200 can comprise: (i) a truck body 210 with a first planar member 211 (back panel) and a first set of support legs 213 disposed at a right angle relative to the first planar member and fixed at a first end of the truck body; (ii) wheels 215 in operable communication with the first set of support legs, such as by way of axle 216; (iii) a load platform 220 with a second planar member 221, which load platform is disposed at the first end of the truck body; (iv) means for connecting the load platform to the truck body (here, axle 226) to provide rotational movement of the load platform between 90-180 degrees away from the first planar member and to lock the load platform at 180 degrees relative to the first planar member (here, support bars 227); (v) a rack 230 disposed at an opposing second end of the truck body, which rack comprises a second set of support legs 232 and handle bar 237; and (vi) means for connecting the rack to the truck body to provide rotational movement of the rack along 180 degrees (here, axle 236) and to lock the rack at a right angles relative to the planar member (for example, locking pin 250 for locking the rack at 90 degrees from the front/top surface of the back panel and handle bar 237 for preventing rotation of the rack further than 270 degrees from the front/top surface of the back panel 211). Optionally, hanging bars 232 can be further supported by a cross bar 233, which provides the dual function of containing tall items within the rack, such as an umbrella (as shown).

Figure 3:
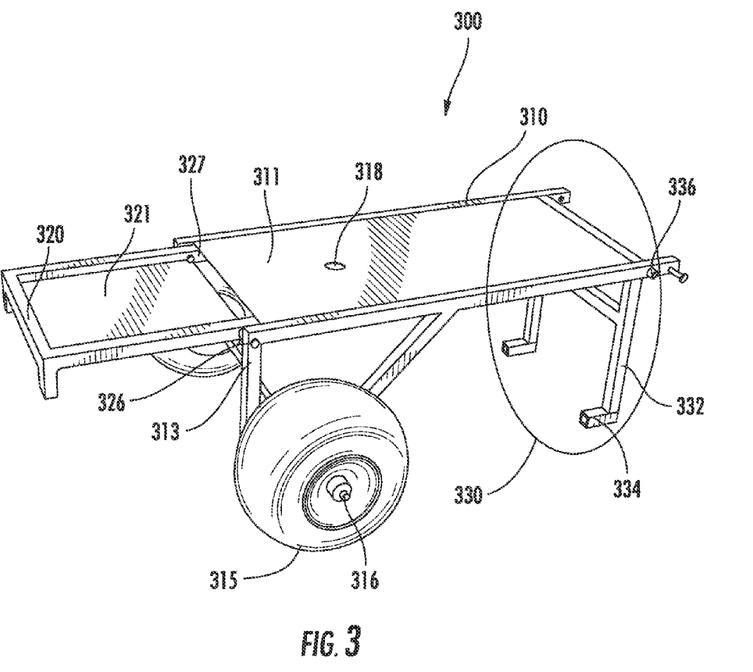
FIG. 3 is a representative diagram of the hand truck shown in FIGS. 1-2, which is in a fully reclined position, with the load platform rotated 90 degrees away from the back panel of the hand truck to form an extension of the table surface, and with the rack rotated 180 degrees away from the back panel to provide the hanging arms of the rack in a position to be used as support legs for the table.

FIG. 3 is a representative diagram of the hand truck shown in FIGS. 1-2, which is in a fully reclined position to function as a table or other work surface. As shown, table 300 is the hand truck tipped backward toward the ground about 90 degrees. In this position, the back panel of the hand truck now functions as a table top 311. This embodiment provides a hole 318 in the surface 311 of the table 300 for accommodating the pole of a beach umbrella. Other means for supporting a beach umbrella can be used instead or in addition, such as a clip mounted to the frame 310 of the table. The hole 318 or other means for securing the umbrella should be configured to removably receive and support at least one umbrella.

Support legs for the table are provided at first and second elongated ends of the table. In particular, at the first elongated end of the table, support legs 313 are integral to or connected in a fixed manner to the table frame 310. Support legs 313 can be disposed at any angle relative to the frame, such as from about 30 degrees, to about 45 degrees, to about 90 degrees (as shown). A second set of support legs 332 is provided at an opposing elongated end of the table by rotating hanging bars 332 from one locked position to another.

More particularly, a first locked position (shown in FIG. 1) provides the hanging bars in position for hanging items on the cart (ie, a right angle with respect to back panel 111) As shown in FIG. 3, support legs 332 are part of the rack component 330 of the hand truck, and are rotated from the rack position (see FIG. 1) to about 180 degrees away from the surface of the back panel 311, where the handle bar (hidden from view under table top 311) rests up against the underside of panel 311 and prevents further rotation of this component 330. Rotation of the rack 330 relative to the hand truck body 310 can be accomplished by any means, such as axle 336 as in this embodiment. If desired, means can be provided for locking the rack component 330 in this position to function as a support base for the table. Preferably, the table 300 is configured to provide both elongated ends of the table at about the same height above the ground on which the table rests, ie, the top surface of the table is approximately parallel to the surface of the ground. To achieve this goal, support legs 332 should have one height and support legs 313 should have a height that is less than that of support legs 332, as additional height is added to the first elongated end of the table by the additional height provided by wheels 315. The elongated ends of the table need not be exactly at the same height, as some variation even up to 50% or more can be tolerated and render the table useful for its intended purpose as a work surface. Further, means for preventing insertion of the support legs 332 into the earth or other soft surface can be incorporated. In this embodiment, the hooks on the hanging bars of the rack will serve the dual purpose as feet 334 for stabilizing the table on the surface of the ground.

The load bearing platform 320 and corresponding base panel 321 of the hand truck serves as a table surface 320/321 of the table when the hand truck is fully reclined. To achieve this function, the hand truck is reclined and then, along axle 326, the load platform 320 is rotated away from the back panel 311 to a position that is 180 degrees away from the back panel. In this manner, depending on the configuration of the load platform, the base panel 321 can be provided in a plane that is parallel to the back panel 311, or the base panel 321 can be disposed in the same plane as the main table panel 311. As shown, panel 321 can be recessed in frame 320 such that the panel 321 is provided in a slightly lower parallel plane as compared with panel 311. By designing the hand truck with a recessed base panel 321, extra security can be provided for belongings loaded on the platform 321 of the hand truck, which ensures the items do not slip off the cart during transportation.

Once rotated to a table surface position, the load platform 321 is prevented from further rotation toward the ground by support bars 327. More particularly, support bars 327 extend the frame 320 under panel 311 and as such frame 320 cannot be rotated beyond the position shown in FIG. 3. An additional lock (such as locking pin and hole) can be provided to maintain this position, if desired.

In certain embodiments, the wheels 315 may have a substantial width allowing them to move easily on sandy and paved surfaces. In some embodiments, the width of the wheels is in the range of from about 1 to about 10 inches, preferably from about 2-6 inches. In certain embodiments the wheels are connected to the hand truck body 310 by a combination of support legs 313 and an axle 316. Preferably the size and orientation of the wheels 315 are selected such that the hand truck resists tip over. For example, in the embodiment shown in FIGS. 1-4, the wheels 315 are disposed at the base of the hand truck at a position where the wheels will contact the ground at about the same distance from the hand truck as the feet of the load platform when the hand truck is in an upright position. Preferably this distance is greater than 25% of the height of the hand truck to provide a base with a width that is greater than half the height of the hand truck. Such configurations will be difficult to tip over.

Figure 4:
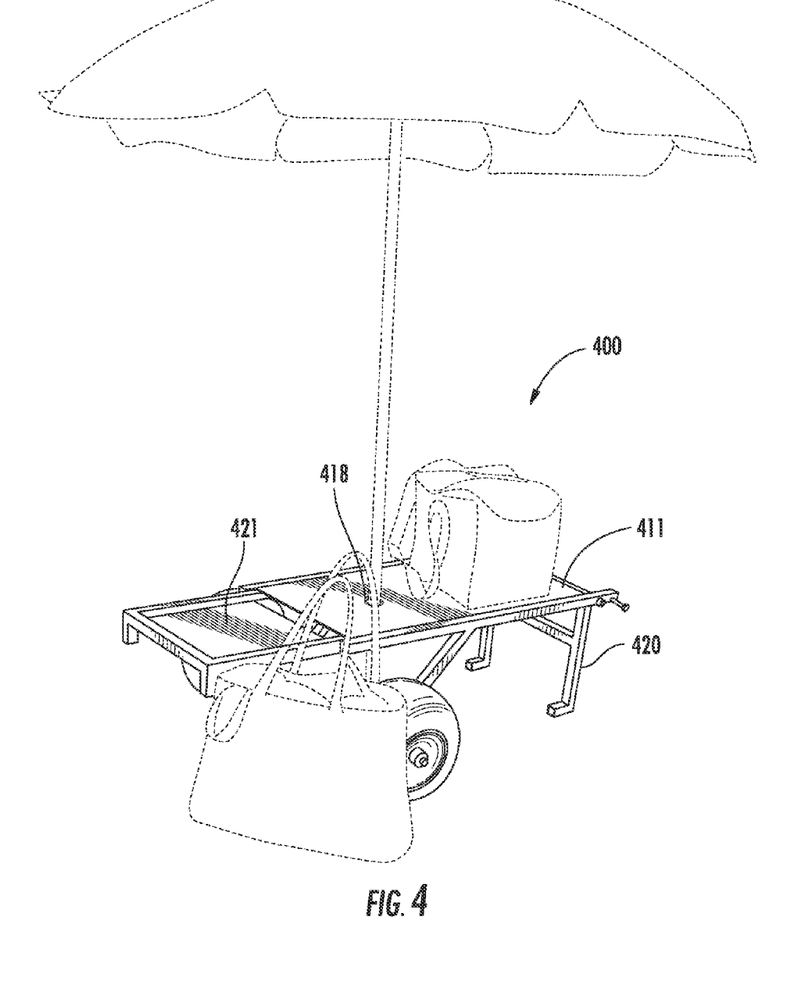
FIG. 4 is a representative diagram of the hand truck shown in FIGS. 1-3, in a fully reclined position and supporting a cooler and umbrella.

FIG. 4 demonstrates use of the hand truck as a table. As shown, table 400 provides a sturdy, solid work surface 411. This surface can be used as an table top surface would be used, such as for eating meals, playing card games, or working. An extension of the work surface is provided by panel 421. An umbrella for providing shade to the table during use is supported by umbrella hole 418. Such embodiments provide a strong hand truck and table, which is easily converted from one to the other using only three actions, namely rotating the rack 420 to a support leg position, then fully reclining the hand truck until the support legs contact the ground, then rotating the load platform 421 to be useful as an extension of the table surface 411. Because the cart and table are the same piece, users can enjoy all the comforts a table provides at a remote location such as the beach without the discomfort of transporting the table to the site as a separate item to be loaded on the cart, which most users would probably forgo as the burden of transporting a conventional table to the beach far outweighs the benefit provided by the furniture.

Figure 5A:
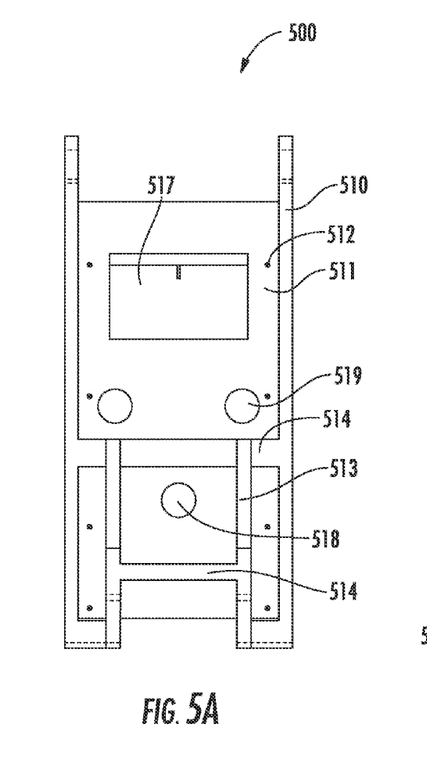
FIGS. 5A-D provide another hand truck according to embodiments of the invention, namely rear and side elevation views and a representative axle and axle bushing.

FIGS. 5A-D provide another hand truck according to embodiments of the invention, showing respectively rear and side elevation views and a representative axle and axle bushing. As shown in FIG. 5A, a rear elevation view reveals a hand truck frame 510 made of 1" square aluminum tubing. At a first end of the frame (bottom) attached to the frame is a structural support assembly for the wheel system. In this embodiment, the support assembly for the wheels comprises support bars 513 and cross bar 514, both made of the same material as the frame for convenience, but could be made of different material if desired. The support bars 513/513 can also be made of 1" square aluminum tubing or for additional strength can be made of 2×1" tubing. As shown, support bars 513/514 have a 2×1" profile. One difference between this embodiment shown in FIGS. 5A and 5B and the embodiment shown in FIG. 1 is that the wheel base and supports 513/513 are offset from the outer edges of the frame 510. With the supports 513/514 offset from the frame 510, the overall cart has a smaller width. If the offset is equal to the width of the wheels, then the wheels will not add additional width to the cart. In this embodiment, the support assembly for the wheels is attached to one end of the frame 510 and a cross bar 514. Alternatively, and as shown in previous figures of this specification, the support frame for the wheels can be attached to the sides of frame 510, or attached to both the sides and end of frame 510, or any combination thereof. An advantage to having the support assembly for the wheels attached at a more interior portion of the frame 510 is that the overall width of the base of the cart 500 can be reduced making it easier to move through narrow hallways and/or doors. It is preferred to have the support structure for the wheels offset in this manner from the frame by about 4 inches on each side of the frame.

Along the length of the frame 510 is a single planar sheet of aluminum 511. This sheet of aluminum can also be made of different material or the same as the frame 510. In this embodiment, the aluminum sheet 511 provides a back panel for the overall hand truck and functions secondarily as a table top surface when the cart is in a reclined position. Holes 512 can be provided in combination with bungee cords or a spider net for securing items within the cart during transport. Holes 512 although shown in panel 511 can alternatively or in addition be drilled into any surface of frame 510, including the top, bottom, or side surfaces. A locking compartment 517 for valuables can also be included on the cart. It is noted that for customization of the cart, a family name or other indicia can be carved, labeled, or stamped on the back panel 511 directly above the box 517 and in or on the aluminum material itself. Similarly, cup holders 519 can be secured to the back of the cart. A hole for supporting the pole of an umbrella 518 can also be incorporated into the cart.

Figure 5B:
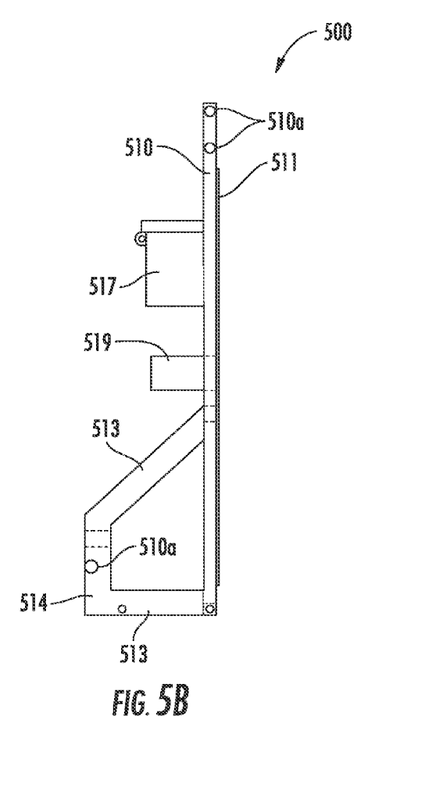

As shown in FIG. 5B, hand truck frame 510 can comprise one or more holes 510a in the frame for securing other components of the cart to. For example, at the upper elongated end of the cart shown in this figure, one set of holes (on each side of the frame) can accommodate an axle for the handle bar component for attaching the handle bar to the cart in a manner that provides for rotation of the handle bar relative to the frame of the cart. A second set of holes can accommodate a locking pin for securing or locking the handle bar component in one or more rotational positions. Likewise, holes 510a at the bottom of the cart can include a first set for accommodating the axle for the wheels. A second set of holes can be incorporated into the bottom of the frame for accommodating an axle for the load platform to allow rotational movement of the platform relative to the cart. A third set of holes can accommodate locking pins for securing the load platform in a 90 degree position relative to the cart so that the load platform is in condition for supporting items in the cart during transport. In this embodiment, the aluminum back panel 511 is secured to the frame 510 by way of rivets disposed in and through the aluminum sheet and into the front surface of the frame of the hand truck, although other means can also be used such as screws, welding, tabs, or a tongue and groove connection. A side profile of a representative box 517 is shown, but any type of compartment, whether locking or not, can be used to secure additional items on the back of the cart. Cup holders 519 can also be included. In this embodiment the support assembly for the wheels comprises five support bars 513/514 connected together to provide maximum support for the wheels. For example, support legs 513 are connected to the frame 510 or a cross bar of the frame and are then connected together by supports 514, which are in turn connected with an addition cross bar support 514. Although in this configuration, one of support legs 513 is disposed at a 90 degree angle to frame 510 and support bar 514 and the other of support legs 513 is connected to the frame at a 45 degree angle and support bar 514 at a 135 degree angle, any orientation between these components is possible.

Figure 5C:
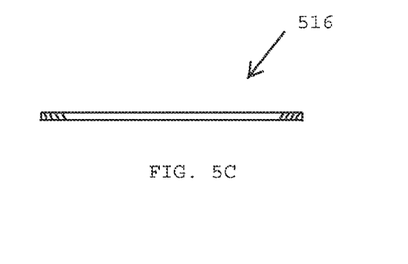
Figure 5D:
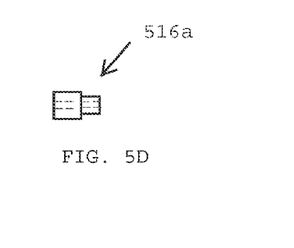
Figure 6A:
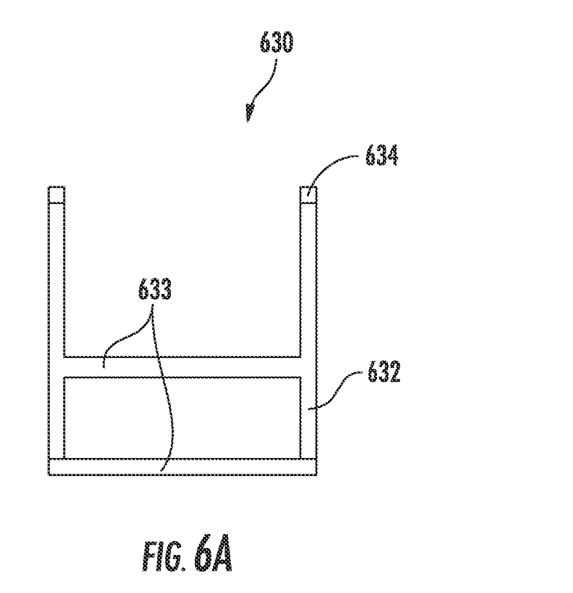
FIGS. 6A and 6B provide respectively a top planar view and a side elevation view of the handle bar component of hand trucks according to embodiments of the invention.
Figure 6B:
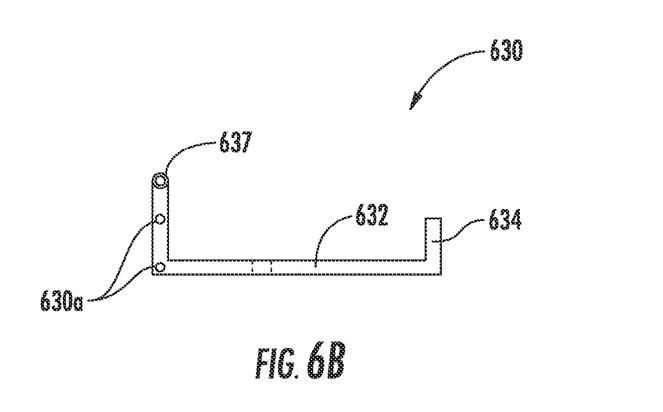

A representative height for the frame 510 in the embodiment shown in FIGS. 5-7 is about 36 inches, while the depth is about 8 inches, and the width is about 16 inches.

FIGS. 5C and 5D show a representative axle 516 an axle bushing 516a for securing the wheels to the cart in a manner to provide for rotation of the wheels relative to the cart and for movement of the cart from one location to another. Here, a rod with means for securing the bushing is used. Such means can be a threaded rod or a rod with holes for accommodating a locking pin for securing the wheels in place on the rod.

FIGS. 6A and 6B provide respectively a top planar view and a side elevation view of the handle bar component of hand trucks according to embodiments of the invention. As shown in FIGS. 6A and 6B, the handle bar component 630 can comprise rack arms 632 and hooks 634. Here, for convenience of construction, rack arms 632 and hooks 634 are made of aluminum tubing and welded together at a 90 degree angle. Alternatively, the rack 632 and hooks 634 can be a single molded piece and the hooks 634 need not be disposed at a right angle to the rack arms, rather any angle can be used so long as the hooks are capable of providing support for objects against slipping off of the rack and support for the table against insertion of the support legs 632 into the ground surface when the hand truck is reclined. The handle bar 637 in this configuration is a round piece of aluminum tubing for a comfortable grip. Also, the handle bar 637 is disposed at a right angle with respect to support legs 632 so that the handle bar will prevent rotation of the support legs 632 past a certain point when using the cart as a table. With handle bar 637 at a right angle in this manner, the support legs 632 of the table can be positioned and fixed at a right angle relative to the bottom of the table surface. One or more holes or sets of holes 630*a* can be incorporated into the rack component frame. As shown in FIG. 6B, holes 630*a* provide means for securing the handle bar to the hand truck frame by way of an axle (any rod and securing means) and means for accommodating a locking pin for securing the handle bar in a fixed position and operable as a hand grip for the cart. In this embodiment, the width of the handle bar component is about 13 inches so that it can be accommodated within the frame of the hand truck and secured thereto. The height of the hooks 634 is about 3 inches, which provides generous security for hanging items in the cart as well as provides substantial resistance against insertion into sand when used as a table. The height of the hand grip is about 5 inches from the base of the rack 630 and provides an additional height of about 2-3 inches to the cart frame when attached thereto.

Figure 7A:
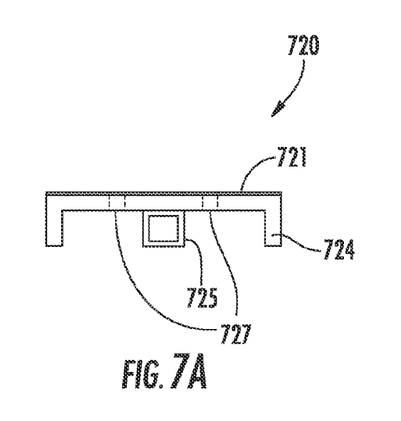
FIGS. 7A-D show various views of a load platform according to the invention.

FIGS. 7A-D show various views of a load platform embodiment according to the invention. In particular, FIG. 7A shows a front elevation view of load platform 720 comprising means 725 for securing the load platform to a trailer hitch of a vehicle, such as a square tubular structure for slideable engagement with a trailer hitch. Mounting bracket 725 can be affixed to the frame of the load platform by welding or any other appropriate means, such as screws. As shown, the load platform can comprise a planar member 721 for supporting items in the cart. Here, the planar member 721 is secured to the frame of the load platform by rivets, but any alternative means can be used. Since the panel 721 is secured to the top surface of the frame, there is no recess of the platform 721 within the frame. Such a surface may be desirable when it is more important to have the extension table (formed by planar member 721) at or almost level with the surface of the planar element of the body of the hand truck/table during use of the assembly as a table. Feet 724 can be added to the base of the load platform 720 so that the hand truck stands at about a 90 degree angle relative to the ground when upright. Support bars 727 (only shown in outline) are provided for preventing rotation of the load platform 720 beyond a desired point, as is explained in more detail with respect to other figures. The width of the platform in this embodiment is about 16 inches and about 3.5 inches in height.

Figure 7B:
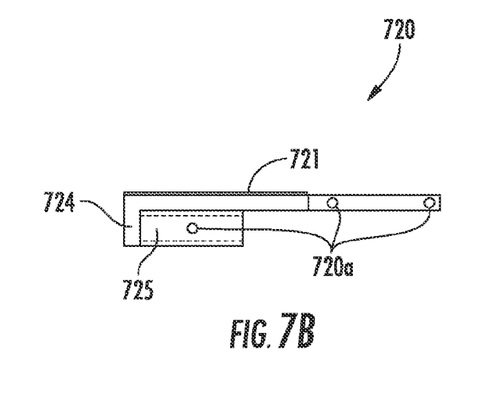

FIG. 7B shows a side elevation view of the load platform 720 comprising a body or frame 720, holes 720*a* for securing the load platform to other components, base panel 721, feet 724, and securing bracket 725. The load platform 720 can comprises one or more holes 720*a* for securing the platform to the cart, for fixing rotational movement of the platform in a desired position, or for connecting the platform to a trailer hitch. For example, one set of holes 720*a* can be used for securing the platform to a trailer hitch, while another set can be used to support an axle about which the platform can rotate relative to the cart body, and a third set of holes 720*a* can be used to accommodate a locking pin to fix the platform 720 in a position and manner capable of operating as the base of a dolly to support items loaded on the cart and during transportation of the cart from location to location. The overall length of the platform 720 shown in this view is about 21-22 inches, with an amount of the platform expected to extend in front of the cart about 14 inches.

Figure 7C:
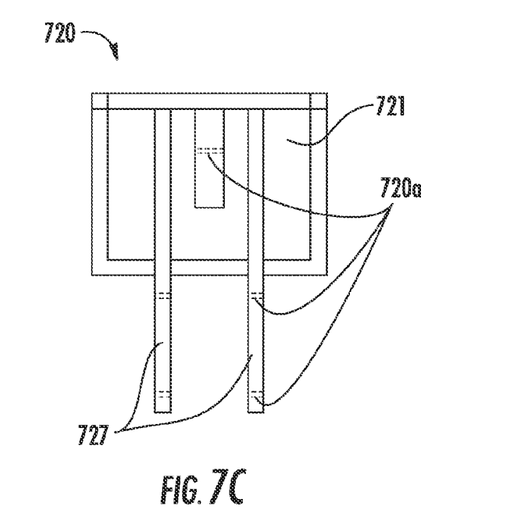

FIG. 7C shows a bottom planar view of the load platform 720. This embodiment comprises a body 720, a panel member 721, holes 720*a*, and support arms 727. The support arms 727 in combination with a set of holes 720*a* provides support for this component when in position as an extension of the table surface. More particularly, when the platform 720 is rotated into a position away from the cart body and about 180 degrees relative to the table surface of the cart body (as an extension of the table surface) support arms 727 rest against the bottom surface of the table top (or other structure such as a cross bar of the cart frame) and prevent further rotation of the platform beyond the 180 degree position. In this position the load platform is an extension of the table surface with the planar member of the main body and the planar member of the load platform being in or about the same plane. Although the support bars 727 can be one in the same as the frame 720 of the load platform, it is preferred that support bars 727 are offset from the frame of the load platform by an amount that allows for clearance of the wheel support system under the hand truck body. For example, if the wheel support assembly is offset by about 4 in on each side of the frame of the main body of the hand truck (measured to the innermost edge of the tubing), then it is preferred that support bars 727 are offset (measured to the outermost edge of the tubing) from the frame of the load platform 720 by the same or a greater distance. In this manner, the support bars will not be prevented from rotating due to interference with other parts of the hand truck.

Figure 7D:
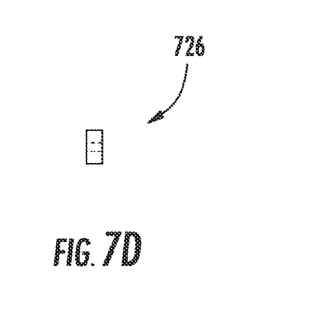

FIG. 7D is a representative hinge bushing 726. Although any means can be used to secure the load platform 720 to the cart body in a manner that provides for rotational movement of the platform relative to the cart, the preferred means is to use a nut and bolt combination. The bolt can be inserted into hole 720*a* and secured with bushing 726.

The convertible beach cart of the present invention may further comprise additional features that would help with storage and organization of the materials and belongings. In an embodiment, the convertible beach cart of the present invention may comprise at least one storage bag for attachment to each hanging bar or across both hanging bars. A person of ordinary skill in the art, with the benefit of this disclosure, would know the type of additional features that may be added to improve storage and organization.

The convertible beach cart of the present invention may further comprise additional features that would help with transportation of the materials and belongings. For example, in an embodiment, the convertible beach cart of the present invention may comprise raised edges on the rectangular base for securing items in tow. A person of ordinary skill in the art, with the benefit of this disclosure, would know the type of additional features that may be added to improve transportation of materials and belongings. In certain embodiments, the convertible beach cart may be configured to support up to about 150 lbs.

One of the many potential advantages of the methods of the present invention, only some of which are discussed in this specification, includes that the present invention provides a hand truck assembly having a weather-proof surface that allows a user to easily arrange items and materials needed on the convertible cart. Beach carts according to the present invention can be configured to resist tip over when standing in an upright position whether or not loaded with materials for the beach. In addition, the compact design of the convertible cart allows for easy maneuvering on uneven terrain, such as sandy beaches. Another advantage of the present invention is to provide a convertible cart assembly having the ability to be transformed into a beach table. This transformation allows for the cart to be much smaller in size as it does not need to be large enough to haul a beach table along with all the other materials and belongings. Further, less equipment is needed for a day at the beach when the vehicle for transporting the needed items is the same piece of equipment as the furniture to be used at the beach upon arrival. Another advantage of embodiments of the present invention includes the easy clean-up of the convertible beach cart. The surface may be easily rinsed or wiped off without having to turn the cart over or empty an entire area, as commonly needed with conventional cart designs.

The manner of use and operation of the present invention should be apparent from the above description. Accordingly, no further discussion relating to the manner of use and operation will be provided. With respect to the above description then, it is to be realized that the optimum dimensional relationships for the parts of the invention, to include variations in size materials, shape, form, function and manner of operation, assembly and use, are deemed readily apparent and obvious to one skilled in the art, and all equivalent relationships to those illustrated in the drawings and described in the specification are intended to be encompassed by the present invention.

The present invention has been described with reference to particular embodiments having various features. It will be apparent to those skilled in the art that various modifications and variations can be made in the practice of the present invention without departing from the scope or spirit of the invention. One skilled in the art will recognize that these features may be used singularly or in any combination based on the requirements and specifications of a given application or design. Other embodiments of the invention will be apparent to those skilled in the art from consideration of the specification and practice of the invention. It is intended that the specification and examples be considered as exemplary in nature and that variations that do not depart from the essence of the invention are intended to be within the scope of the invention.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A convertible hand truck comprising:
a dual-use hand truck body with a first planar member that provides support for items on the hand truck when upright and that provides a table top when reclined 90 degrees;
a dual-use load platform with a second planar member that provides a load bearing surface for loads on the hand truck when upright and that provides an extension of the table top when the hand truck is reclined 90 degrees; and
a dual-use rack that provides support for items on the hand truck when the hand truck is upright and that provides support legs for the table top when the hand truck is, relative to its upright position, reclined 90 degrees;
wherein the rack has a range of rotational motion of 180 degrees with the support legs being rotatable from a position perpendicular to a front surface of the first planar member to a position perpendicular to a back surface of the first planar member.

2. The hand truck of claim 1, wherein the table top comprises a first set of support legs disposed at a right angle relative to the first planar member and fixed at a first end of the table top and wherein the dual-use rack is disposed at an opposing second end of the table top and comprises a second set of support legs.

3. The hand truck of claim 1 further comprising a handle bar, wherein the handle bar is disposed at a right angle relative to arms of the rack to prevent further rotation of the rack arms beyond 90 degrees relative to the lower surface of the first planar member.

4. The hand truck of claim 2, further comprising wheels in operable communication with the first set of support legs.

5. The hand truck of claim 4, wherein the first set of support legs and wheels together provide a height to the first end of the table top that equals a height of the opposing second end of the table top provided by the second set of support legs.

6. A convertible hand truck comprising:
a hand truck body with a first planar member and a first set of support legs disposed at a right angle relative to the first planar member and fixed at a first end of the hand truck body;
wheels in operable communication with the first set of support legs;
a load platform with a second planar member, which load platform is disposed at the first end of the hand truck body;
means for connecting the load platform to the hand truck body to provide rotational movement of the load platform between 90-180 degrees away from the first planar member and to lock the load platform at 180 degrees relative to the first planar member;
a rack disposed at an opposing second end of the hand truck body, which rack comprises a second set of support legs and a handle bar; and
means for connecting the rack to the hand truck body to provide rotational movement of the rack and to lock the rack at right angles relative to the planar member;
wherein the rack has a range of rotational motion of 180 degrees with the second set of support legs being rotatable from a position perpendicular to a front surface of the first planar member to a position perpendicular to a back surface of the first planar member.

7. The hand truck of claim 6 further comprising an umbrella hole.

8. The hand truck of claim 6, wherein the load platform comprises feet.

9. The hand truck of claim 6, wherein the second set of support legs comprise feet.

10. The hand truck of claim 6, which is less than twice as tall as it is wide.

11. The hand truck of claim 6 comprising metal.

12. The hand truck of claim 6, wherein the load platform has raised edges for securing items in tow.

13. The hand truck of claim 6, configured to support a load of 200-500 pounds.

14. The hand truck of claim 6, wherein the handle bar is disposed at a right angle relative to arms of the rack to prevent further rotation of the rack arms beyond 90 degrees relative to the lower surface of the first planar member.

15. The hand truck of claim 9, wherein the wheels and the second set of support legs are operably configured for supporting the table on sand in a manner to provide the first and second planar members parallel to the sand.

16. The hand truck of claim 15, wherein the wheels are 4-6 inches wide and the feet are at least two inches wide.

* * * * *